June 27, 1961 E. F. NICASTRO 2,990,212
PIVOTALLY MOVABLE BUMPER FOR MOTOR VEHICLES
Filed Aug. 30, 1957 2 Sheets-Sheet 2
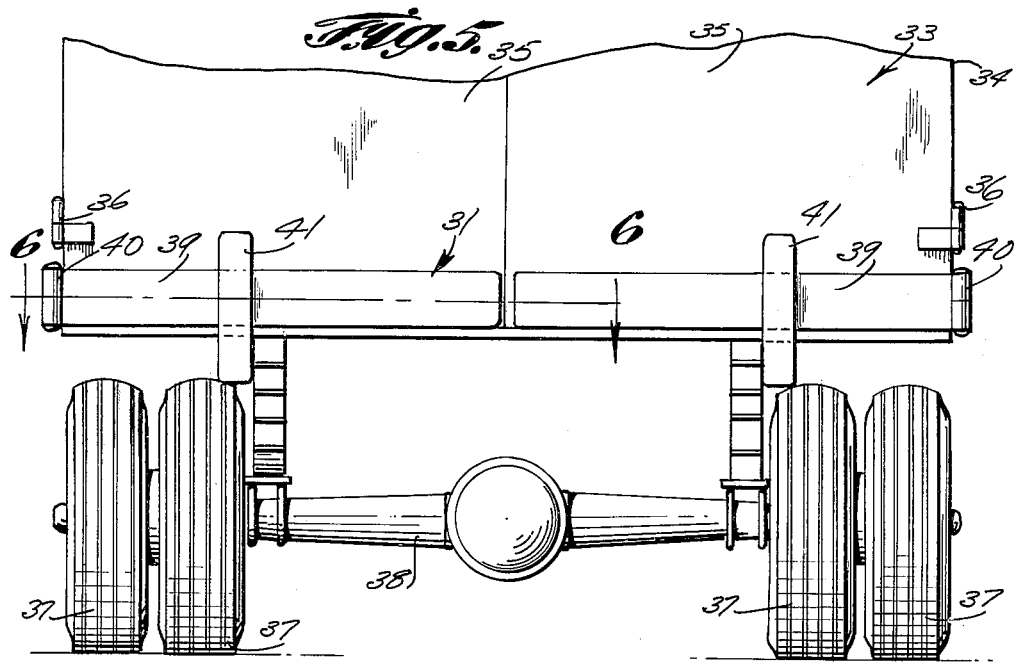
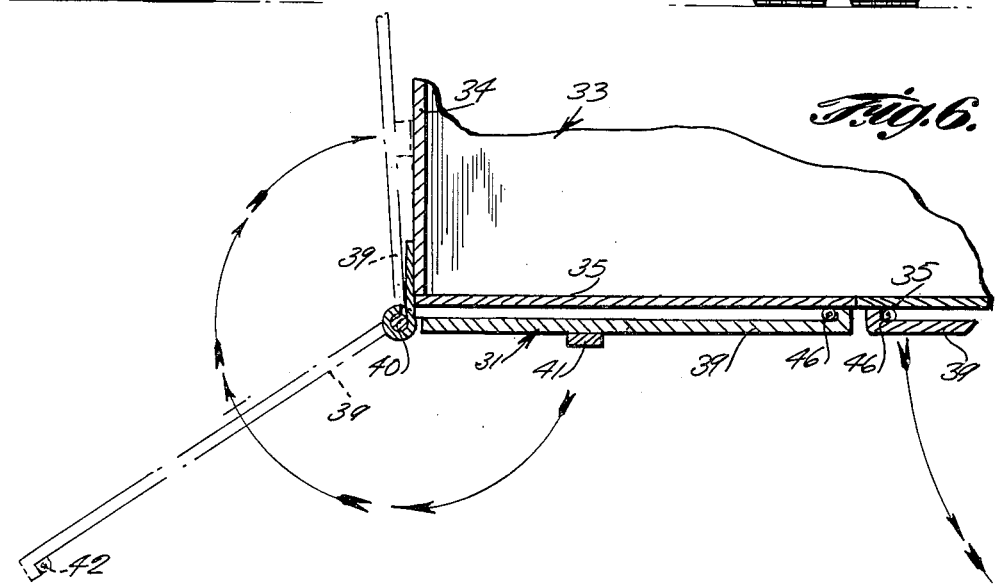
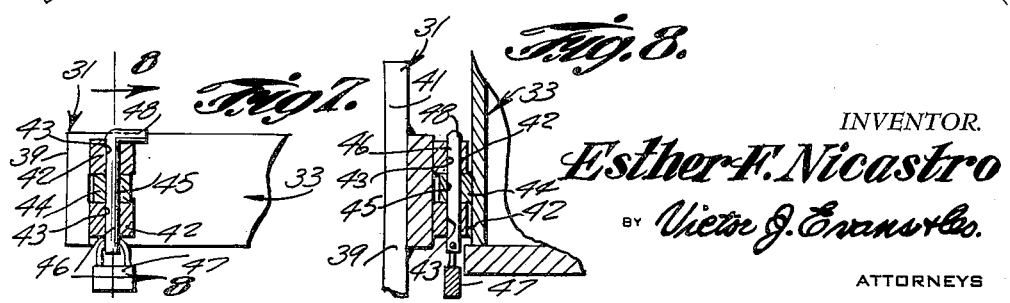
INVENTOR.
Esther F. Nicastro
BY Victor J. Evans & Co.
ATTORNEYS

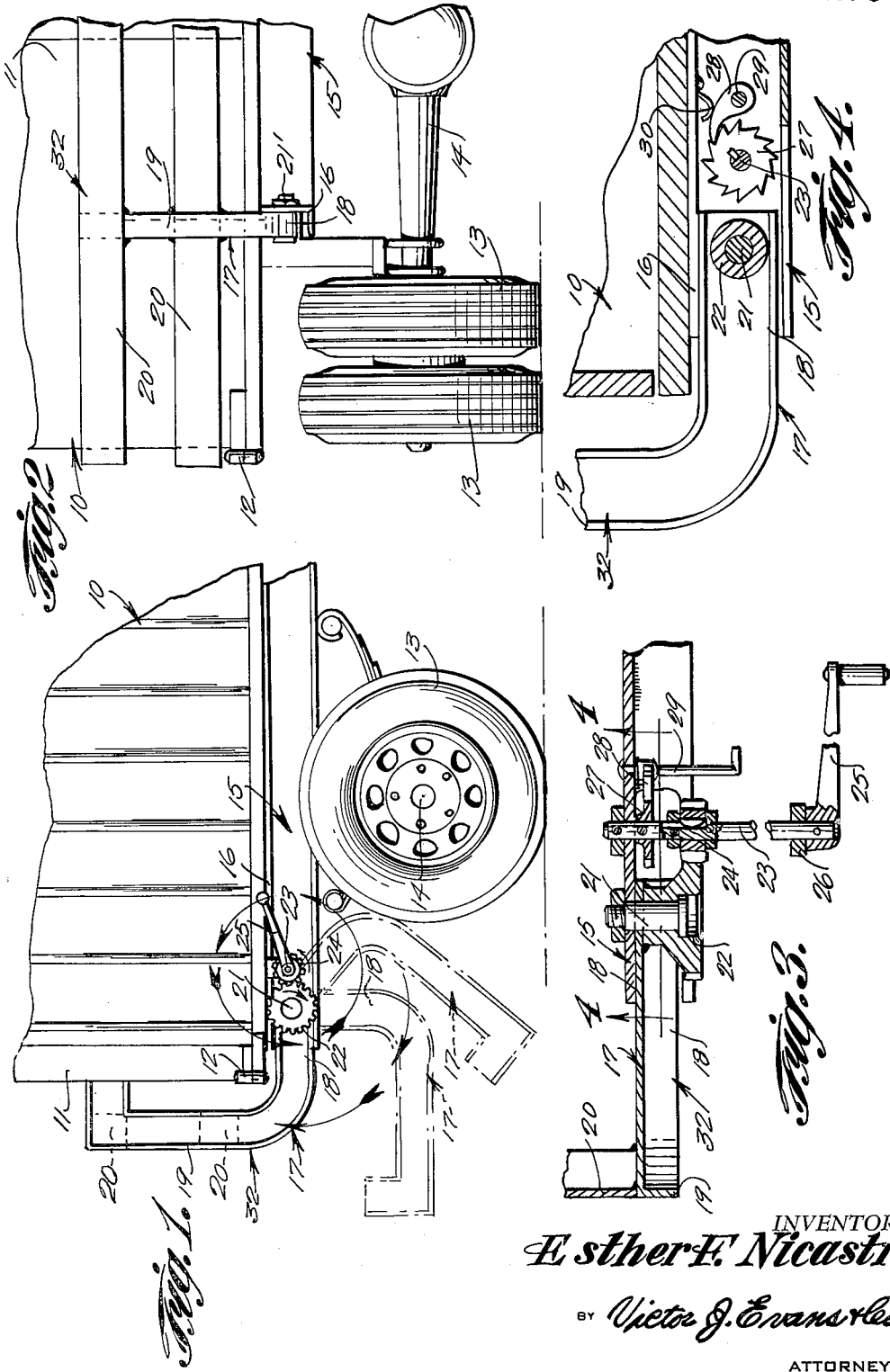

United States Patent Office 2,990,212
Patented June 27, 1961

2,990,212
PIVOTALLY MOVABLE BUMPER FOR MOTOR VEHICLES
Esther F. Nicastro, 417 Meridian St., East Boston 28, Mass.
Filed Aug. 30, 1957, Ser. No. 681,326
1 Claim. (Cl. 293—34)

This invention relates to a motor vehicle, and more particularly to a movable bumper for a motor vehicle.

The object of the invention is to provide a bumper assembly for a motor vehicle such as a truck or trailer wherein the bumper assembly is constructed so that it can be readily swung or moved out of the way as for example when a truck elevator is to be used, or when the truck end gates are to be opened or closed.

Another object of the invention is to provide a movable bumper assembly for a vehicle such as a truck or trailer, wherein there is provided a means for moving the bumper assembly to a position so that the vehicle will be protected when the bumper assembly is in operative position, and wherein there is further provided a means for shifting or swinging the bumper assembly to an out-of-the-way position, as for example when the truck end gates are to be opened or closed, or when an elevating mechanism is to be actuated.

A further object of the invention is to provide a vehicle movable bumper assembly which is extremely simple and inexpensive to manufacture.

Other objects and advantages will be apparent during the course of the following description.

In the accompanying drawings, forming a part of this application, and in which like numerals are used to designate like parts throughout the same.

FIGURE 1 is a fragmentary side elevational view illustrating the movable bumper assembly of the present invention.

FIGURE 2 is a rear elevational view taken at right angle to the view shown in FIGURE 1.

FIGURE 3 is a horizontal fragmentary sectional view illustrating the mechanism of FIGURES 1 and 2.

FIGURE 4 is a sectional view taken on the line 4—4 of FIGURE 3.

FIGURE 5 is a fragmentary rear elevational view illustrating a modified bumper assembly which can be moved.

FIGURE 6 is a sectional view taken on the line 6—6 of FIGURE 5.

FIGURE 7 is a fragmentary sectional view illustrating the locking mechanism for retaining one of the bars of FIGURE 5 in closed position.

FIGURE 8 is a sectional view taken on the line 8—8 of FIGURE 7.

Referring in detail to the drawings, and more particularly to FIGURES 1 through 4 of the drawings, the numeral 10 indicates a body portion of a vehicle such as a truck or trailer, and the vehicle is provided with the usual end gates or doors 11 which may be arranged at the rear of the body portion. These end gates 11 may be pivotally mounted on hinges 12 so that the end gates 11 can be swung open, as for example, when cargo or material is to be loaded into or removed from the body of the vehicle. The vehicle further includes the usual rear wheels 13 and rear axle 14.

Positioned beneath the body portion 10 is a frame 15 which includes spaced apart channel members 16. The numeral 17 indicates each of a pair of arms, and each of the arms 17 includes a first portion 18 which terminates in an angularly arranged second portion 19. A pair of spaced parallel bars 20 are secured to the portions 19 of the arms 17, in any suitable manner, as for example by welding.

A means is provided for moving the bars 20 and arms 17 so that for example, these parts can be moved to and from the solid and broken line position shown in FIGURE 1. This means comprises a pin 21 or a pin 21' which extends through one of the channel members 16 and through the adjacent arms 17, FIGURE 3. A gear member 22 is mounted on the pin 21, and the gear member 22 is secured as by welding to the portion 18 of the arms 17. The numeral 23 indicates a shaft which is supported in the frame of the vehicle, and the shaft 23 has a pinion gear 24 thereon which meshes with the gear member 22. A crank 25 is connected to the outer end of the shaft 23 whereby the shaft 23 can be conveniently rotated. The numeral 26 indicates a bearing for supporting the shaft 23, and the bearing 26 may be suspended from the truck bed.

There is further provided a ratchet mechanism for controlling rotation of the shaft 23, and this ratchet mechanism includes a ratchet wheel 27 which is mounted on the shaft 23, and a pawl 28 is mounted for movement into and out of engagement with the teeth of the ratchet wheel 27. A spring member 30 urges the pawl 28 into engagement with the ratchet wheel 27, and a release rod 29 is connected to the pawl 28 as shown in FIGURE 4.

Referring now to FIGURES 5 through 8 of the drawings, there is shown a modified movable bumper assembly which is indicated generally by the numeral 31. The movable bumper assembly of FIGURES 1 through 4 is indicated generally by the numeral 32. The movable bumper assembly 31 is adapted to be used with a vehicle such as the truck 33 which includes a body portion 34 that has end gates 35 hingedly supported by means of hinges 36. The truck 33 further includes the usual rear wheels 37 and axle 38.

The bumper assembly 31 includes a pair of bars 39 which are pivotally connected to the body portion 34 by means of hinges 40, and upstanding guard members 41 are secured to the bars 39 in any suitable manner, as for example by welding. The bars 39 are mounted for swinging or pivotal movement about a vertical axis extending through the hinges 40.

There is further provided a means for locking the bars 39 in operative position contiguous to the end gates 35, and this means comprises apertured lugs 42 which extend from an end of each of the bars 39. The lugs 42 are provided with apertures or openings 43, and arranged between each pair of lugs 42 is an ear 44 that is formed integral with or secured to each of the end gates 35, and each ear 44 has an opening 45 which is adapted to register with the openings 43 in the lugs 42. The numeral 46 indicates a locking rod or pin which is adapted to extend through the registering openings 43 and 45, and a suitable padlock 47 is adapted to be connected to the lower end of the rod 46, there being a transverse handgripping portion 48 on the upper end of the rod 46, FIGURE 7.

From the foregoing, it is apparent that there has been provided a movable bumper assembly for use with a vehicle such as a truck or trailer. As shown in FIGURES 1 through 4 there is illustrated a bumper assembly which is indicated generally by the numeral 32, and the bumper assembly 32 includes a pair of arms 17 which are mounted for swinging movement about a horizontal axis. The pair of arms 17 have secured thereto the pair of bars 20, and when the bars 20 are in the position shown in FIGURE 2 for example, it will be seen that the rear portion of the vehicle will be protected from shocks, collisions or the like. However, when the truck elevator is to be used, or when the doors or end gates 11 are to be swung open, then the hand crank 25 can be rotated in order to pivot or move the parts downwardly from the solid line position shown in FIGURE 1 to the broken line position of FIGURE 1 whereby there will be no interference with use of the truck elevator or with swinging movement of the end gates 11. Thus, by properly rotating the crank 25, counter-clockwise as shown by the arrows, FIG. 1, the shaft 23 will be rotated, and this will turn the pinion gear 24. Since the pinion gear 24 meshes with the gear member 22, it will be seen that this will result in swinging movement of the arms 17 which are connected together through the medium of the bars 20. The pawl 28 is pressed into engagement with the teeth of the ratchet wheel 27 by means of a spring member 30, and by manually moving the rods or handle 29, the pawl 28 can be moved out of engagement with the ratchet wheel 27 so as to provide a means for controlling rotation of the shaft 23 and its associated parts. The gear member 22 is secured as by welding to one of the arms 17 so that as the gear member 22 is rotated, both arms 17 as well as the bars 20 will move.

Referring now to FIGURES 5 through 8 of the drawings, there is shown a modified bumper assembly which is indicated generally by the numeral 31, and the bumper assembly 31 includes a pair of bars 39 which are mounted for swinging movement about the hinges 40. For retaining the bars 39 in the closed position, the rods 46 are adapted to be extended through the registering openings 43 and 45, and then a suitable padlock such as the padlock 47 can be connected to the lower end of the rod 46. By means of a suitable key, the lock 47 can be opened whereby the rod 46 can be readily disengaged from the openings 43 and 45, so that the bars 39 can be pivoted or swung from the solid line position shown in FIGURE 6 for example, to the broken line position shown in FIGURE 6. Thus, when the bars 39 which have the guard members 41 thereon are in the solid line position of FIGURE 6, or in the position shown in FIGURE 5, then the bars 39 and guard members 41 will provide protection for the rear of the vehicle. However, by disengaging the locking mechanism and swinging the bars 39 from the solid line position of FIGURE 6 to the broken line position of FIGURE 6, then the end gates 35 can be opened on the hinges 40, and also, with the bars 39 in the broken line position of FIGURE 6, the truck elevator can be used without encountering any obstructions or interference.

The parts can be made of any suitable material and in different shapes or sizes. Also, the bumper can be locked in its various adjusted positions. Also, the bumper assembly can be made so that it will fit on the vehicles of different types, shapes or sizes.

From the foregoing, it will be seen that there has been provided a bumper which can be moved out of the way when it is not being used, as for example when a truck or other vehicle is being loaded or unloaded, so that with the bumper out of the way, the truck elevator can move up or down for loading or unloading the truck or trailer. The mechanism for swinging or moving the bumper may be varied if desired, as for example, a motor or the like can be used for moving the bumper. After the vehicle has been loaded or unloaded, the bumper is returned to its raised position and the bumper will serve to protect the various items of the equipment such as expensive tail elevators or trucks, trailers or the like. As shown in FIGURE 5, the bumper may be of the type which opens in the middle to permit normal operation of the elevator hoist or truck.

The above description of the invention is for illustrative purposes only and it is understood that modifications may be made in the construction within the scope and spirit of the following claim.

I claim:

In a motor vehicle, a body portion, end gates hingedly connected to the rear end of said body portion in transverse axial alinement with each other, horizontally disposed longitudinally extending parallel channel members positioned below, connected to and supporting said body portion, a movable bumper assembly mounted for movement towards and away from said end gates, said bumper assembly comprising a pair of parallel disposed arms pivotally connected to the rear ends of said channel members, said arms including a first horizontally disposed portion terminating in a right angularly vertically disposed second portion that is in parallel relation to said end gates, a pair of spaced parallel bars secured to the second portions of said arms, said bars being arranged in parallel relation to said end gates, means mounted in the rear ends of said channel members and connected to said arms for moving and retaining said arms and bars out of the path of movement of said end gates to permit said end gates to be opened or closed, said means comprising a pin extending through one of said arms and an adjacent channel member, a gear member on said pin, a shaft extending through a channel member and arranged adjacent said pin, a pinion gear on said shaft meshing with said gear member, a crank connected to said shaft, and a spring pressed ratchet and pawl mechanism connected to said shaft for preventing rearward rotation of said shaft, and a handle for releasing said pawl.

References Cited in the file of this patent

UNITED STATES PATENTS

| Number | Name | Date |
|---|---|---|
| 4,250 | Mussey | Nov. 1, 1845 |
| 550,364 | Du Bouis | Nov. 26, 1895 |
| 874,575 | McGranor et al. | Dec. 24, 1907 |
| 893,491 | Hansen | July 14, 1908 |
| 983,041 | Gierding | Jan. 31, 1911 |
| 1,082,415 | Didschuneit | Dec. 23, 1913 |
| 1,240,216 | Ihnat | Sept. 18, 1917 |
| 1,442,542 | Scherrman | Jan. 16, 1923 |
| 1,772,906 | Lukan | Aug. 12, 1930 |
| 1,812,580 | Black | June 30, 1931 |
| 2,042,911 | Stannard | June 2, 1936 |
| 2,324,507 | Johnson | July 20, 1943 |
| 2,537,553 | Schonauer | Jan. 9, 1951 |
| 2,603,527 | Perkins | July 15, 1952 |
| 2,637,586 | Meyer et al. | May 5, 1953 |
| 2,653,845 | Benjamin | Sept. 29, 1953 |
| 2,721,758 | Allen | Oct. 25, 1955 |

FOREIGN PATENTS

| Number | Country | Date |
|---|---|---|
| 316,894 | Great Britain | Jan. 16, 1930 |